(12) United States Patent
Braga

(10) Patent No.: US 8,118,329 B2
(45) Date of Patent: Feb. 21, 2012

(54) FENDER FLARES AND VEHICLES WITH FENDER FLARES

(75) Inventor: Roberto M. Braga, Portland, OR (US)

(73) Assignee: Bushwacker, Inc., Portland, OR (US)

( * ) Notice: Subject to any disclaimer, the term of this patent is extended or adjusted under 35 U.S.C. 154(b) by 609 days.

(21) Appl. No.: 12/197,149

(22) Filed: Aug. 22, 2008

(65) Prior Publication Data

US 2009/0167011 A1    Jul. 2, 2009

Related U.S. Application Data

(60) Provisional application No. 61/009,387, filed on Dec. 27, 2007.

(51) Int. Cl.
    *B62D 25/18*    (2006.01)
(52) U.S. Cl. .................. 280/848; 280/851; 296/198
(58) Field of Classification Search .................. 280/848, 280/154, 851; 296/198
See application file for complete search history.

(56) References Cited

U.S. PATENT DOCUMENTS

| | | | | |
|---|---|---|---|---|
| 4,169,608 A * | 10/1979 | Logan | ............ | 280/848 |
| 4,447,067 A * | 5/1984 | Yamashita | ............ | 280/848 |
| 4,605,238 A * | 8/1986 | Arenhold | ............ | 280/851 |
| 4,621,824 A * | 11/1986 | Arenhold | ............ | 280/851 |
| 4,709,938 A * | 12/1987 | Ward et al. | ............ | 280/851 |
| 4,784,430 A * | 11/1988 | Biermacher | ............ | 296/198 |
| 5,048,868 A * | 9/1991 | Arenhold | ............ | 280/848 |
| 5,120,082 A * | 6/1992 | Ito | ............ | 280/851 |
| 5,238,268 A * | 8/1993 | Logan | ............ | 280/848 |
| 5,340,154 A * | 8/1994 | Scott | ............ | 280/848 |
| 5,613,710 A * | 3/1997 | Waner | ............ | 280/848 |
| D382,239 S | 8/1997 | Logan et al. | | |
| 5,697,644 A * | 12/1997 | Logan et al. | ............ | 280/848 |
| 5,722,690 A * | 3/1998 | Ward et al. | ............ | 280/851 |
| 5,823,553 A | 10/1998 | Thompson | | |
| 5,879,045 A | 3/1999 | Logan | | |
| 6,070,908 A * | 6/2000 | Skrzypchak | ............ | 280/847 |
| 6,193,278 B1 * | 2/2001 | Ward et al. | ............ | 280/848 |
| 6,205,642 B1 * | 3/2001 | Czirmer | ............ | 29/525.13 |
| 6,959,948 B2 * | 11/2005 | Varnhagen et al. | ............ | 280/849 |
| 7,114,749 B2 * | 10/2006 | Ward | ............ | 280/848 |
| D570,509 S | 6/2008 | Logan | | |
| 7,578,527 B2 * | 8/2009 | Iverson et al. | ............ | 280/851 |
| 7,717,467 B2 * | 5/2010 | Iverson | ............ | 280/847 |
| 7,766,356 B2 * | 8/2010 | Iverson | ............ | 280/154 |
| 2002/0158460 A1 * | 10/2002 | Logan | ............ | 280/848 |
| 2004/0140664 A1 * | 7/2004 | Ward | ............ | 280/848 |
| 2005/0275212 A1 | 12/2005 | Angelaitis | | |
| 2008/0001390 A1 | 1/2008 | Iverson | | |
| 2009/0167011 A1 * | 7/2009 | Braga | ............ | 280/848 |

* cited by examiner

*Primary Examiner* — Jeffrey J Restifo
(74) *Attorney, Agent, or Firm* — Dascenzo Intellectual Property Law, P.C.

(57) ABSTRACT

Fender flares are disclosed for attachment to a vehicle having a mud flap and a wheel well that generally defines a volume. Vehicles that include fender flares are also disclosed. In some embodiments, a fender flare includes a body having a first surface and a second surface that together define a mud-flap channel that is adapted to receive the mud flap of a corresponding vehicle. In some embodiments, a fender flare includes a body that is configured to support more than one side of the mud flap of a corresponding vehicle. In some embodiments, a fender flare includes an inner portion extending from an outer portion, with the inner portion having a first surface adapted to support a front side of a mud flap, and with the outer portion having a second surface adapted to support a rear side of a mud flap.

20 Claims, 4 Drawing Sheets

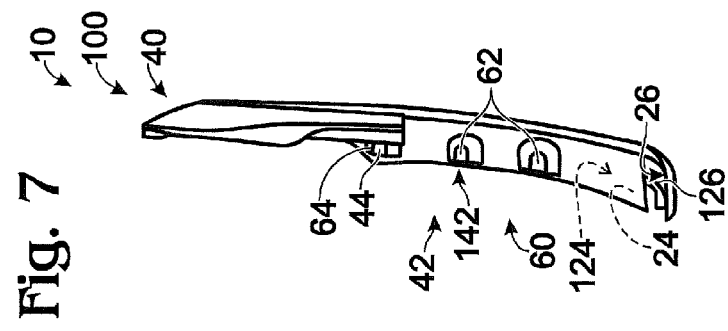
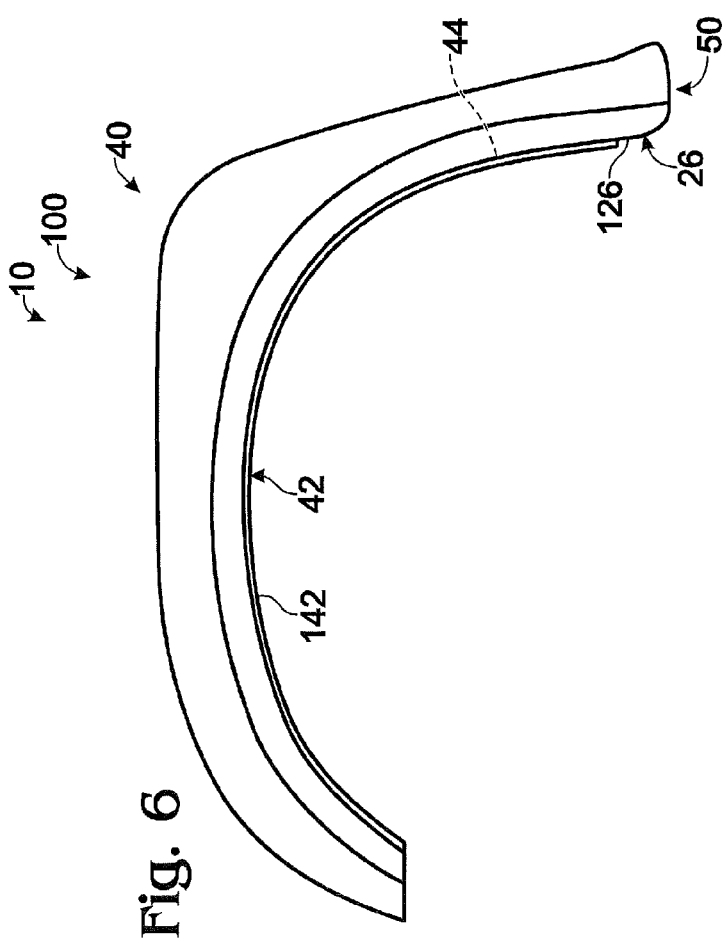
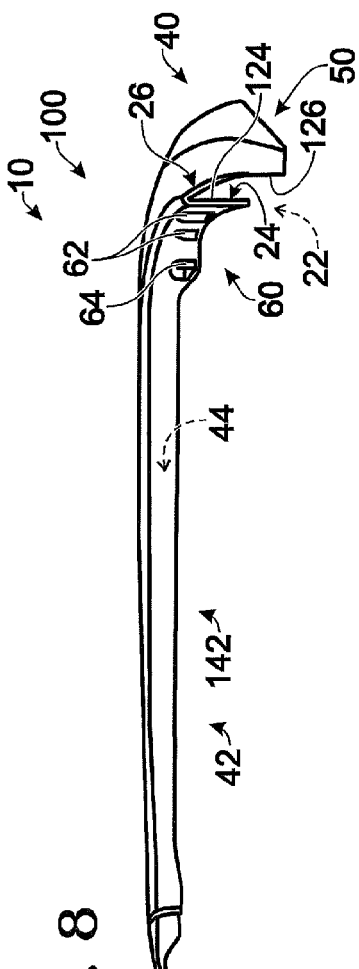

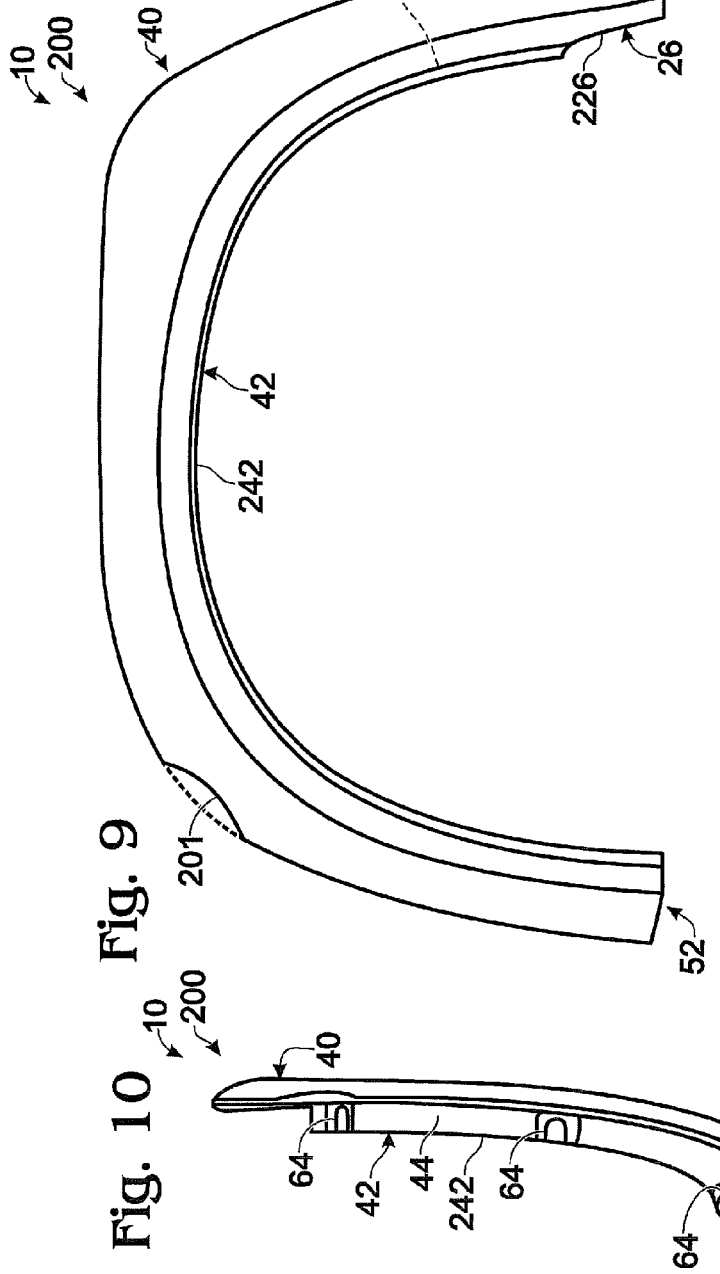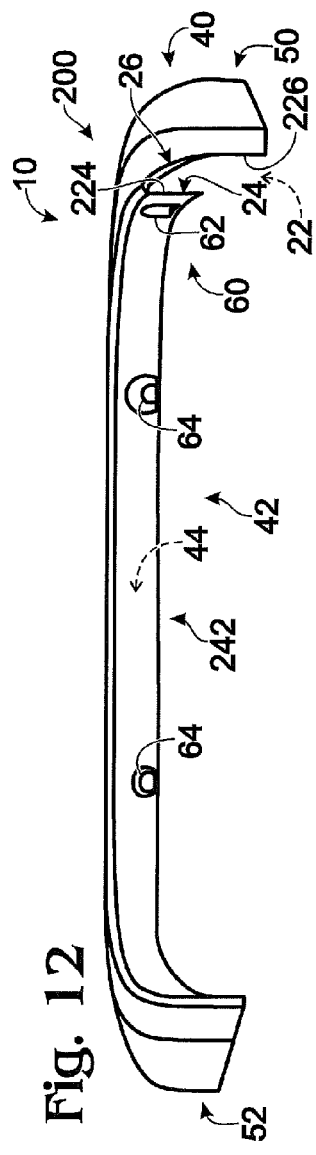

FENDER FLARES AND VEHICLES WITH FENDER FLARES

RELATED APPLICATION

The present application claims priority under 35 U.S.C. §119(e) to U.S. Provisional Patent Application Ser. No. 61/009,387, entitled "FENDER FLARES," which was filed on Dec. 27, 2007, and the disclosure of which is hereby incorporated by reference.

FIELD OF THE DISCLOSURE

The present disclosure is directed generally to fender flares for vehicles, and more particularly to fender flares for vehicles with mud flaps and to vehicles with mud flaps and fender flares.

BACKGROUND OF THE DISCLOSURE

Vehicles such as pickup trucks and sport utility vehicles (SUVs) often include mud flaps positioned behind one or more of the vehicle's wheels to prevent spray of mud, water, and/or debris on the vehicle body and/or in the air behind the vehicle. On some vehicles, a traditional mud flap may be simply a rectangular piece of rubber that is bolted, or otherwise attached, to a wheel well so that the traditional mud flap extends below the body of the vehicle and behind the corresponding tire.

On other vehicles, a mud flap may be more integral to the wheel well itself. That is, the mud flap, while still being bolted or otherwise attached to a vehicle body, may be more structural than a traditional mud flap (e.g., a traditional rubber mud flap), and may define at least a portion of the wheel well itself. In such vehicles, the mud flap may be described as a portion of the wheel well itself and/or as an extension of the wheel well, and may be made of plastic, metal and/or another material that is more structural or stiffer than rubber, for example. Such mud flaps may be described as factory mud flaps, because they may be designed, manufactured, and installed by the manufacturer of the vehicle, as opposed to being manufactured by an aftermarket supplier and installed by a consumer. A non-exclusive example of a vehicle having a factory mud flap is a 2008 TOYOTA® SEQUOIA® vehicle. On the 2008 TOYOTA® SEQUOIA® vehicle, the factory mud flap actually forms part of the structure that defines the wheel well and is not simply a bolted-on piece of rubber. Stated differently, the factory mud flap on the 2008 TOYOTA® SEQUOIA® vehicle does not simply extend below the lower edge of the vehicle body, and instead forms part of the structure of the wheel well and further extends below the lower edge of the vehicle body, thereby extending the wheel well.

Fender flares are vehicular body extensions that may be installed on a vehicle for a variety of aesthetic and/or functional reasons. For example, fender flares may be used to enhance the appearance of a vehicle. Additionally or alternatively, fender flares may be used to ensure that tire widths extending beyond, or outside of, a vehicle's wheel well are adequately covered to prevent spray of mud, water, and/or debris on the vehicle body as well as in the air behind the vehicle. Accordingly, fender flares may be described as extending the width, or depth, of a vehicle's wheel wells.

Fender flares may be installed by the vehicle manufacturer, for example as part of the original design of the vehicle. Additionally or alternatively, fender flares may be installed aftermarket as a customization of a vehicle. Examples of aftermarket fender flares are disclosed in U.S. Pat. Nos. 5,238,268, 5,879,045, 5,697,644, and D570,509, and in U.S. patent application Ser. Nos. 09/843,507 and 12/132,544, the disclosures of which are hereby incorporated by reference.

SUMMARY OF THE DISCLOSURE

Fender flares according to the present disclosure are configured for attachment to a vehicle having a mud flap extending from and/or at least partially defining a wheel well of a vehicle. Some examples of fender flares according to the present disclosure may be described as being configured for attachment to a vehicle having factory mud flaps. Some examples of fender flares according to the present disclosure include a first surface and a second surface that together define a mud-flap channel adapted to receive therein a mud flap of a corresponding vehicle. The first surface may be adapted to engage, mate with, and/or support a front side of the mud flap, and the second surface may be adapted to engage, mate with, and/or support a rear side of the mud flap. Some examples of fender flares according to the present disclosure include a body that is configured to support more than one side of the mud flap of a corresponding vehicle. Some examples of fender flares according to the present disclosure include an inner portion extending from an outer portion, with the inner portion having a first surface adapted to extent proximate, face, and/or support a front side of a mud flap, and with the outer portion having a second surface adapted to extend proximate, face, and/or support a rear side of a mud flap. In some examples of fender flares according to the present disclosure, the fender flare may be installed on a vehicle with the corresponding mud flap received into the fender flare's mud-flap channel, without removal of the mud flap from the vehicle. Vehicles that include fender flares according to the present disclosure are also within the scope of the present disclosure.

BRIEF DESCRIPTION OF THE DRAWINGS

In FIG. 3, the dashed lines represent hidden edges of the schematically illustrated fender flare and mud flap.

In FIG. 4, the dashed lines represent hidden edges of the schematically illustrated fender flare and mud flap.

In FIG. 5, the dashed lines represent hidden edges of the schematically illustrated fender flare and mud flap.

FIG. 6 is a detailed left-side view of an illustrative, non-exclusive example of a left-front fender flare according to the present disclosure.

FIG. 7 is a detailed front view of the fender flare of FIG. 6.

FIG. 8 is a detailed bottom view of the fender flare of FIG. 6.

FIG. 9 is a detailed left-side view of an illustrative, non-exclusive example of a left-rear fender flare according to the present disclosure.

FIG. 10 is a detailed front view of the fender flare of FIG. 9.

FIG. 11 is a detailed rear view of the fender flare of FIG. 9.

FIG. 12 is a detailed bottom view of the fender flare of FIG. 9.

DETAILED DESCRIPTION AND BEST MODE OF THE DISCLOSURE

Figure 1:
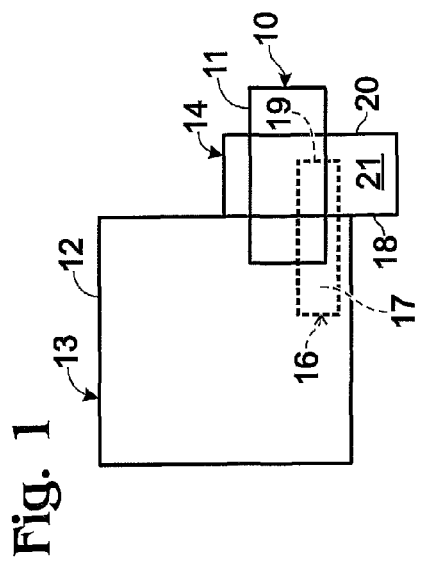
FIG. 1 is a block diagram schematically illustrating a fender flare according to the present disclosure, together with a vehicle body, a mud flap, and a wheel well defined at least partially by the vehicle body and the mud flap.

Fender flares according to the present disclosure are schematically illustrated in FIG. 1 and are indicated generally at 10. As illustrated, fender flares 10 include a body 11 that may be coupled to a vehicle body 12 of a vehicle 13 and may at least partially engage and/or support a mud flap 14. Mud flap 14 may be described as being coupled to the vehicle body 12. Additionally or alternatively, a mud flap 14 may be considered part of a vehicle body 12, such as by forming a structural portion of the vehicle's wheel well. As illustrated, vehicle body 12 may include, or at least partially define, a wheel well 16 that is bounded by the vehicle body. Additionally or alternatively, as schematically illustrated in FIG. 1, vehicle body 12 and mud flap 14 may at least partially define the wheel well 16. Stated differently, a mud flap according to the present disclosure may at least partially define, and/or may define at least a portion of, the wheel well. Wheel well 16 may be described as generally defining a volume 17 and having an outer lateral edge 19 along which at least a substantial portion (if not all) of the fender flare extends. For example, volume 17 may at least partially contain a corresponding wheel assembly of the vehicle (e.g., a wheel and a tire). In some embodiments, fender flare 10 also may be described as defining at least a portion of the wheel well 16, or alternatively as at least partially defining the wheel well. Additionally or alternatively, a fender flare according to the present disclosure may be described as extending the width of the wheel well of a vehicle. In some embodiments, the fender flare, or the body thereof, may be described as being a generally arcuate fender flare, for example, to generally correspond to a side profile of a wheel well of a vehicle.

As schematically illustrated in FIG. 1, fender flare 10 may extend on, or face, more than one side of mud flap 14, for example, on a first, or front, side 18 of the mud flap and on a second, or rear, side 20 of the mud flap. Front and rear sides 18 and 20 may additionally or alternatively be referred to as the front and rear surfaces of the mud flap. The fender flare may also extend on, or face, an edge portion 21 of the mud flap between front side 18 and rear side 20. As used herein, relative spatial terms such as in front of, behind, under, front, rear, forward, left, right, top, bottom, etc. relate to the orientation of a corresponding vehicle. Accordingly, the front side 18 of a mud flap generally faces the volume of the wheel well and the corresponding wheel assembly and toward the front of the vehicle, and the rear side 20 of a mud flap generally faces away from the volume of the wheel well and the corresponding wheel assembly and toward the rear of the vehicle.

Figure 2:
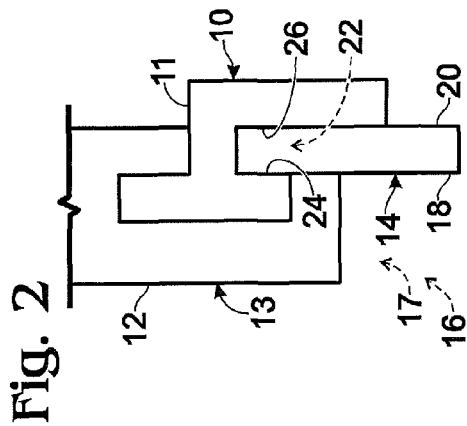
FIG. 2 is a block diagram schematically illustrating a fender flare according to the present disclosure, together with a vehicle body and a mud flap.

Fender flares 10 according to the present disclosure may be described as being configured to engage or support opposite, or opposing, sides of a mud flap 14. Additionally or alternatively, as schematically illustrated in FIG. 2 (which schematically represents a cross-section of a fender flare 10, a vehicle body 12, and mud flap 14), fender flares 10 may be described as providing a mud-flap channel 22, through which a corresponding mud flap 14 may at least partially extend, or be received, when fender flare 10 is appropriately installed on a vehicle having a mud flap 14. Mud-flap channel 22 also may be described as a mud-flap-receiving channel, slot, or pocket. It is within the scope of the present disclosure that fender flare 10 may be properly installed on a vehicle, with mud flap 16 being received into mud-flap channel 22, without requiring removal of the mud flap from the vehicle to permit this installation.

As schematically illustrated in FIG. 2, fender flares 10 may include a first surface 24 and a second surface 26, with the first and second surfaces 24, 26 defining the mud-flap channel 22. In such embodiments, the first surface 24 may be described as facing the front side 18 of the mud flap, and the second surface 26 may be described as facing the rear side 20 of the mud flap, when a mud flap is received in the mud-flap channel. Additionally or alternatively, first and second surfaces 24, 26 of the fender flare may engage (or be configured to engage) the front and rear sides 18, 20 of the mud flap, respectively. Additionally or alternatively, first and second surfaces 24, 26 of the fender flare may support (or be configured to support) the front and rear sides 18, 20 of the mud flap, respectively. Additionally or alternatively, first and second surfaces 24, 26 of the fender flare may mate with (or be configured to mate with) the front and rear sides 18, 20 of the mud flap, respectively. It is within the scope of the present disclosure that one or both of the first and second surfaces 24, 26 of a fender flare 10 does not directly contact the respective front side 18 or rear side 20 of a corresponding mud flap 14, for example, because washers, spacers, adhesive material, gaskets, or other fastening mechanisms or components may be used for installation of a fender flare according to the present disclosure.

As also schematically illustrated in FIG. 2, first and second surfaces 24, 26 of a fender flare 10 may oppose, or face, one another. Additionally or alternatively, the first and second surfaces 24, 26 of a fender flare 10 may be non-co-planar. For example, first and second surfaces 24, 26 may be spaced apart to accommodate a thickness of a corresponding mud flap, as schematically illustrated in FIG. 2. As mentioned, first and second surfaces 24, 26 may be described as defining a mud-flap channel for receiving a portion of a mud flap therein.

Figure 5:
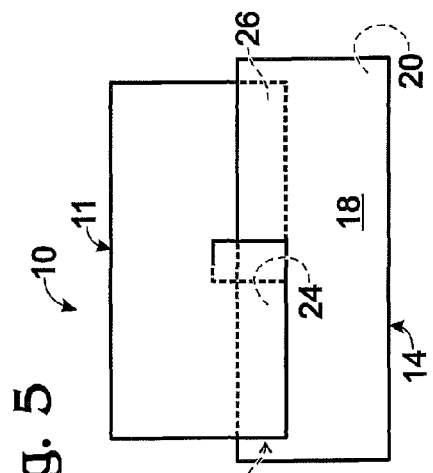
FIG. 5 is a block diagram schematically illustrating a fender flare according to the present disclosure, together with a mud flap having a front side and a rear side, the fender flare including a first surface that faces the front side of the mud flap and a second surface at least partially opposing the first surface and that faces the rear side of the mud flap.
Figure 4:
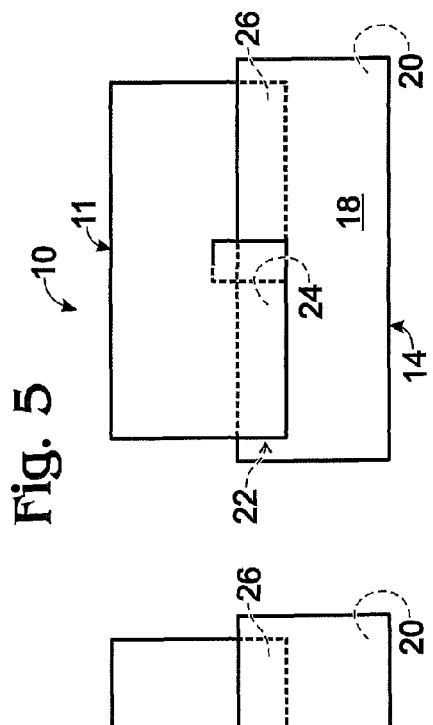
FIG. 4 is a block diagram schematically illustrating a fender flare according to the present disclosure, together with a mud flap having a front side and a rear side, the fender flare including a first surface that faces the front side of the mud flap and a second surface laterally offset from and adjacent the first surface and that faces the rear side of the mud flap.
Figure 3:
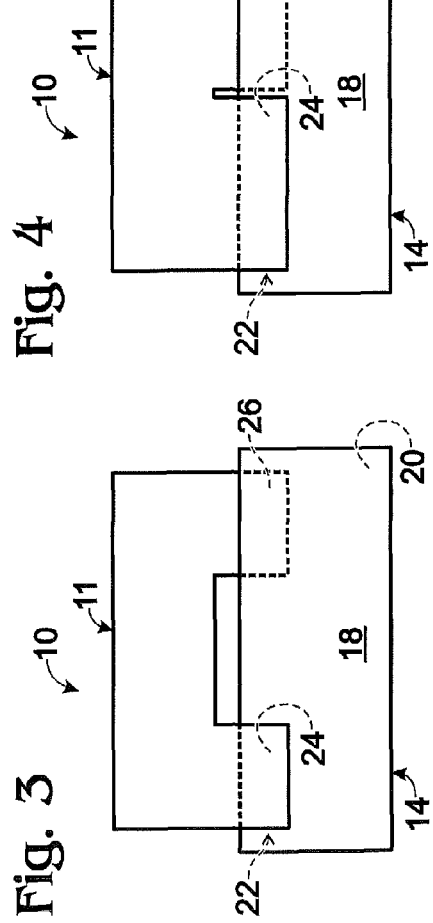
FIG. 3 is a block diagram schematically illustrating a fender flare according to the present disclosure, together with a mud flap having a front side and a rear side, the fender flare including a first surface that faces the front side of the mud flap and a second surface laterally spaced away from the first surface and that faces the rear side of the mud flap.

Additionally or alternatively, first and second surfaces 24, 26 of a fender flare may directly oppose, or face, one another. Additionally or alternatively, only a portion of first surface 24 may oppose, or face, second surface 26, or a portion thereof. Other configurations are equally within the scope of the present disclosure. For example, the non-exclusive example of a fender flare 10 schematically illustrated in FIG. 3, includes a first surface 24 that is offset and spaced away laterally from a second surface 26, such that the first surface does not directly face, or oppose, the second surface. The non-exclusive example of a fender flare 10 schematically illustrated in FIG. 4 includes a first surface 24 that is offset laterally, but generally adjacent to, a second surface 26, such that the first surface does not directly face, or oppose, the second surface. The non-exclusive example of a fender flare 10 schematically illustrated in FIG. 5, includes a first surface 24 that overlaps with a second surface 26. That is, the first surface of the fender flare of FIG. 5 partially faces, or opposes, the second surface. Stated differently, a portion of the first surface of the fender flare of FIG. 5 faces, or opposes, a portion of the second surface. Stated still differently, the first and second surfaces 24, 26 of the fender flare of FIG. 5 partially overlap. In FIGS. 3-5, the dashed lines represent hidden (or obstructed) edges of the schematically illustrated fender flares and mud flaps, reference numerals 20 and 24 indicate back side surfaces (as viewed from the perspective of the page), and reference numeral 26 indicates front side—but hidden—surfaces (as viewed from the perspective of the page).

Fender flares 10 according to the present disclosure may be described as supporting (or being configured to support) an associated mud flap. Additionally or alternatively, fender flares 10 may be described as supporting (or being configured to support) more than one side of an associated mud flap. Additionally or alternatively, fender flares 10 may be described as supporting (or being configured to support) opposite sides of an associated mud flap. Additionally or alternatively, fender flares 10 may be described as engaging (or being configured to engage) more than one side of an associated mud flap. Additionally or alternatively, fender flares 10 may be described as engaging (or being configured to engage) opposite sides of an associated mud flap. Additionally or alternatively, fender flares 10 may be described as mating (or being configured to mate) with more than one side of an associated mud flap. Additionally or alternatively, fender flares 10 may be described as mating (or being configured to mate) with opposite sides of an associated mud flap. Additionally or alternatively, fender flares 10 may be described as extending into the wheel well in front of an associated mud flap, as well as extending along the vehicle body rearward and behind a portion of the associated mud flap and/or extending under the vehicle and behind the associated mud flap, when installed on a vehicle with a corresponding mud flap.

Figure 14:
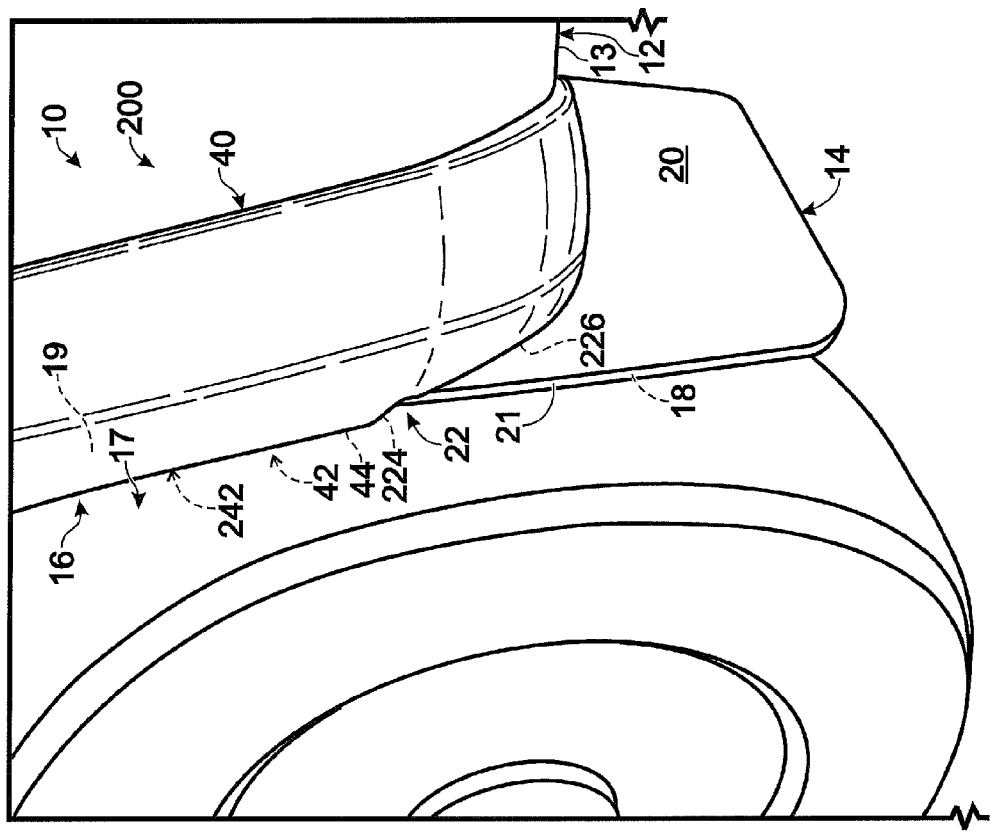
FIG. 14 is a left-rear perspective view of the left-rear portion of the vehicle and left-rear fender flare of FIG. 13.
Figure 13:
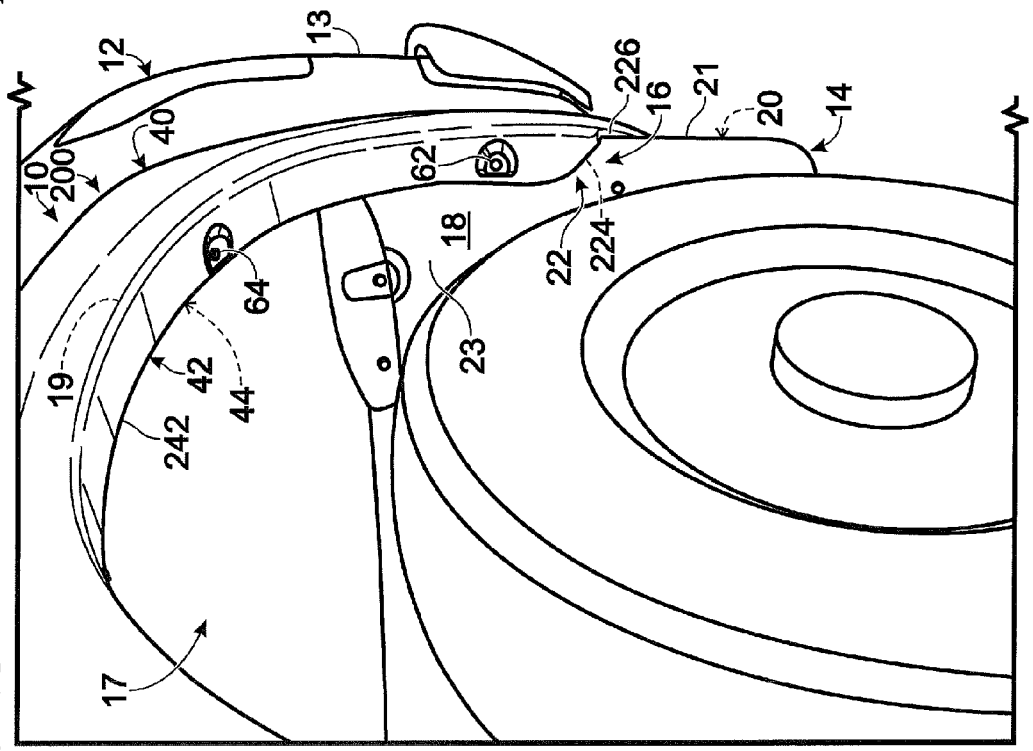
FIG. 13 is a left-front perspective view of a left-rear portion of a vehicle with the left-rear fender flare of FIG. 9 attached thereto.

FIGS. 6-8 illustrate an illustrative, non-exclusive example of a fender flare 10 in the form of a left-front fender flare 100 (i.e., a fender flare configured to correspond with a left-front wheel well of a vehicle). FIGS. 9-12 illustrate a non-exclusive example of a fender flare 10 in the form of a left-rear fender flare 200 (i.e., a fender flare configured to correspond with a left-rear wheel well of a vehicle). Similar right-side fender flares that correspond to mirror images of the left-side fender flares illustrated are equally within the scope of the present disclosure, and the descriptions of the left-side fender flares herein apply equally to right-side fender flares. The illustrated fender flares of FIGS. 6-12 are configured for installation on a 2007 TOYOTA® TUNDRA® pickup truck having factory mud flaps, and FIGS. 13-14 illustrate a fender flare 200 installed on a vehicle 13. Other configurations are equally within the scope of the present disclosure, and the present disclosure is not limited to the specific examples illustrated. For example, the specific shapes, contours, and aesthetic features of the illustrated fender flares are not intended to be limiting, and other configurations may be provided without departing from the scope of the present disclosure. As a specific example, and with reference to FIG. 9, the fender flare includes a recess 201 to accommodate a gas tank cover, or door, which may not be present or necessary for all embodiments, as indicated in dashed lines.

Fender flares 10 are configured to be secured to a corresponding vehicle body and extend at least partially along an edge of a corresponding wheel well (e.g., the left-front, left-rear, right-front, or right-rear wheel well). As indicated in the illustrative, non-exclusive examples of FIGS. 6-12, fender flares 10 may include an outer portion 40 and an inner portion 42 that extends from the outer portion. Outer portion 40 may be defined by one or more contoured surfaces that are configured to extend outward from a corresponding vehicle body and thereby extend the depth of the corresponding wheel well. The inner portion 42 may be configured to engage, mate with, and/or be coupled to structure of the corresponding vehicle body that at least partially defines the corresponding wheel well. Accordingly, inner portion 42 may include an engagement surface 44 that is configured to face away from the volume of the wheel well and to engage, mate with, and/or be coupled to a portion of a vehicle body that at least partially defines a wheel well.

As an illustrative, non-exclusive example, fender flare 100 (illustrated in FIGS. 6-8) includes an inner portion 42 in the form of, or which includes, a flange 142 that extends at an angle from outer portion 40 and that is configured to extend into a corresponding wheel well and mate with, engage, and/or be coupled to structure that defines the corresponding wheel well of a vehicle. Similarly, fender flare 200 (illustrated in FIGS. 9-12) includes an inner portion 42 in the form of, or which includes, a flange 242 that extends at an angle from outer portion 40 and that is configured to extend into a corresponding wheel well and mate with, engage, and/or be coupled to structure that defines the corresponding wheel well of a vehicle.

In such embodiments, at least a portion of inner portion 42 may define a first surface 24 (i.e., a first surface 24 adapted to face a corresponding front side 18 of a corresponding mud flap, as discussed above in reference to FIGS. 2-5). Additionally or alternatively, first surface 24 may be a portion of engagement surface 44. For example, as illustrated in FIGS. 7-8, a portion of flange 142 defines a first surface 124 of fender flare 100. Accordingly, first surface 124 of fender flare 100 is configured to face, mate with, and/or engage a front side of a corresponding mud flap. Similarly, as illustrated in FIGS. 11-12, a portion of flange 242 defines a first surface 224 of fender flare 200. Accordingly, first surface 224 of fender flare 200 is configured to face, mate with, and/or engage a front side of a corresponding mud flap. In such embodiments, inner portion 42 may be designed and manufactured (i.e., shaped, contoured, sized, etc.) specifically for a particular vehicle for which the fender flare is to be attached (e.g., a TOYOTA® TUNDRA® vehicle, TOYOTA® SEQUOIA® vehicle, TOYOTA® LANDCRUISER® vehicle, or any other make and model of vehicle).

As perhaps best seen in FIG. 8, flange 142 of fender flare 100 extends from and along only a portion of the overall length of fender flare 100. Stated differently, flange 142 extends from and along only a portion of the overall length of outer portion 40, with this length being defined along the edge of the corresponding wheel well. Similarly, as perhaps best seen in FIG. 12, flange 242 of fender flare 200 extends from and along only a portion of the overall length of fender flare 200. Stated differently, flange 242 extends from and along only a portion of the overall length of outer portion 40, with this length being defined along the edge of the corresponding wheel well. Accordingly, where flanges 142, 242 of fender flares 100, 200, respectively, do not extend from the respective outer portion 40, a portion of outer portion 40 may define second surface 26 (i.e., a second surface 26 adapted to face a corresponding rear side 20 of a corresponding mud flap, as discussed above in reference to FIGS. 2-5). That is, in a fender flare 100, a portion of outer portion 40 may define a second surface 126, and in a fender flare 200, a portion of outside portion 40 may define a second surface 226, such that surfaces 126, 226 are configured to face, mate with, and/or engage a rear side 20 of a corresponding mud flap. The portion of the outer portion 40 that defines the second surface 226 may also be described as an edge or edge portion of the outer portion 40.

First and second surfaces 124, 126 of fender flare 100, and first and second surfaces 224, 226 of fender flare 200, may be described as offset opposing surfaces that define a mud-flap channel 22 for receiving an associated mud flap. As perhaps best seen in FIG. 8, first and second surfaces 124, 126 are non-co-planar, and as seen in FIG. 12, first and second surfaces 224, 226 are similarly non-co-planar, thereby allowing for a thickness of an associated mud flap to extend between the respective surfaces 124, 126 and 224, 226.

Outer portion 40 of a fender flare 10 may further include a rear lower portion 50 that is configured to wrap under the body of an associated vehicle. In some such embodiments, the forward edge or edge region of the lower rear portion 50 may define second surface 26 (e.g., second surface 126 of fender flare 100 and/or second surface 226 of fender flare 200 as perhaps best seen in FIGS. 8 and 12, respectively). Similarly, though not required to all embodiments, and as shown in fender flare 200 illustrated in FIGS. 9 and 12, outer portion 40 may (but is not required to) include a forward lower portion 52 that is configured to wrap under the body of an associated vehicle.

Fender flares 10 may (but are not required to) further include attachment structure 60 that is configured to compliment corresponding attachment structure of a corresponding mud flap. For example, in the illustrative, non-exclusive example of fender flare 100 illustrated in FIGS. 7-8, the fender flare includes attachment structure 60 in the form of bolt holes 62 that are configured to align with corresponding bolts and bolt holes of a left-front wheel well of a corresponding vehicle. Similarly, in the illustrative, non-exclusive example of fender flare 200 illustrated in FIGS. 11-12, the fender flare includes attachment structure 60 in the form of a bolt hole 62 that is configured to align with a corresponding bolt and bolt hole of a left-rear wheel well of a corresponding vehicle.

Additionally or alternatively, fender flares 10 may include attachment structure that is not configured to align with corresponding attachment structure of corresponding mud flaps. Fender flares 10 may incorporate any suitable structure for attaching the flares to an associated vehicle body, and may include structure such as bolt holes, screw holes, adhesive tape, brackets, flanges, press-fit or snap-fit structures, hook and loop fastening structure, etc. Illustrative, non-exclusive examples of suitable attachment structure are disclosed in the U.S. patent documents incorporated above. The non-exclusive examples of fender flares 100, 200 illustrated in FIGS. 6-12 include additional bolt holes 64 (shown in FIGS. 7-8 and 10-12) extending through flanges 142, 242 for attachment of the fender flares to corresponding wheel wells. In many embodiments, it will be desirable for the fender flare to be configured, such as with suitable attachment structure, to be properly installed on a vehicle without introducing new holes into the vehicle's body, or at least new holes into the sheet metal forming the exterior (painted) sides of the body.

In FIGS. 13 and 14, a fender flare 10, such as left-rear fender flare 200 is shown mounted on a vehicle 12' having a vehicle body 13 with a wheel well 16 defined, or bounded, by the vehicle body and at least a portion of a mud flap 14 that projects from the vehicle body. As shown, wheel well 16 defines a volume 17 into which a wheel assembly of the vehicle is positioned. As indicated in dashed lines at 19, the wheel well includes an outer lateral edge, and the fender flare extends along at least a substantial portion of the outer lateral edge, if not the entirety of the outer lateral edge. As discussed, fender flares are positioned along the outer lateral edge of a wheel well, such as to extend the collective lateral dimension, or width, of the wheel well.

As shown in FIGS. 13 and 14, mud flap 16 includes generally opposed front and rear surfaces (and/or sides) 18 and 20, which in the depicted example are separated by a lateral edge, or edge region, 21. The front surface of the mud flap generally faces, or is oriented toward, the wheel well and/or the front of the vehicle, whereas the rear surface generally faces, or is oriented, away from the wheel well, such as toward the rear of the vehicle. As perhaps best seen in FIG. 13, the illustrated mud flap is an example of a mud flap that forms, or defines, a structural portion of the wheel well. Expressed in slightly different terms, removal of the depicted mud flap would remove a core portion, indicated at generally at 23 in FIG. 13, of the structural boundary of the wheel well within the vehicle body, as opposed to merely removing a downward extension from the vehicle body. As can be appreciated, removal of portion 23 of the wheel well's boundary would provide a relatively large opening through which water, dirt, debris, and the like could pass into the interior of the vehicle's body.

Fender flare 10, which in FIGS. 13 and 14 is depicted as a left-rear fender flare 200, includes first and second surfaces 224 and 226 that are spaced apart from each other to define a mud-flap channel, or mud-flap-receiving channel, 22 therebetween. As further illustrated, mud flap 14 extends within channel 22, with a portion of the fender flare extending in front of the mud flap and a portion of the fender flare extending behind the mud flap. In this example, the fender flare includes an inner portion 42 in the form of a flange 242 that includes an engagement surface 44 that includes first surface 224 that faces front surface 18 of mud flap 14. The fender flare also includes an outer portion 40 that includes second surface 226 that faces rear surface 20 of the mud flap. As illustrated, the first and second surfaces engage the front and rear surfaces of the mud flap and support the mud flap. It is within the scope of the present disclosure that one or both of the first and second surfaces of the fender flare do not directly engage the mud flap, such as if the surfaces are indirectly connected to the mud flap and/or if the surfaces are proximate but spaced apart from the corresponding surface of the mud flap. As perhaps best seen in FIG. 14, a portion of the fender flare extends behind, or rearward, of the mud flap and beneath the vehicle body. It is within the scope of the present disclosure that this portion of the fender flare does not extend beneath the vehicle body.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A fender flare for attachment to a vehicle having a mud flap and a wheel well, wherein the wheel well has an outer lateral edge and generally defines a volume, wherein the mud flap includes a front side that faces the volume of the wheel well and a rear side that faces away from the volume of the wheel well, the fender flare comprising:
   a fender flare body including a first surface and a second surface, the first and second surfaces defining a mud-flap channel adapted to receive the mud flap therein, wherein the first surface faces the front side of the mud flap and the second surface faces the rear side of the mud flap when the mud flap is received in the mud-flap channel;
   wherein the fender flare body is configured to extend along at least a substantial portion of the lateral edge of the wheel well.

2. The fender flare of claim 1, wherein at least a portion of the first surface directly faces at least a portion of the second surface.

3. The fender flare of claim 1, wherein the first surface is offset laterally from the second surface and does not directly face the second surface.

4. The fender flare of claim 1, wherein the first surface is further configured to engage the front side of the mud flap and wherein the second surface is further configured to engage the rear side of the mud flap.

5. The fender flare of claim 1, wherein the fender flare body is configured to extend into the wheel well in front of the mud flap, and wherein the fender flare body is further configured to extend under the vehicle and behind the mud flap.

6. A vehicle, comprising:
   a vehicle body that defines a wheel well that generally defines a volume;
   a mud flap coupled to the vehicle body and including a front side that faces the volume of the wheel well and a rear side that faces away from the volume of the wheel well; and
   a fender flare according to claim 1 coupled to the vehicle body and receiving the mud flap within the mud-flap channel.

7. The vehicle of claim 6, wherein the mud flap defines a portion of the wheel well bounded by the vehicle body.

8. The fender flare of claim 1, wherein the fender flare body includes an outer portion defined by one or more contoured surfaces that are configured to project outward from the vehicle along at least a substantial portion of the outer lateral edge of the wheel well.

9. A vehicle, comprising:
   a vehicle body that defines a wheel well, wherein the wheel well has an outer lateral edge and generally defines a volume;
   a mud flap coupled to the vehicle body and including a front side that faces the volume of the wheel well and a rear side that faces away from the volume of the wheel well; and
   a fender flare coupled to the vehicle body and supporting opposed sides of the mud flap, wherein the fender flare comprises a fender flare body attached to the vehicle, and further wherein the fender flare body extends proximate and supports opposed sides of the mud flap and extends along at least a substantial portion of the outer lateral edge of the wheel well.

10. The vehicle of claim 9, wherein the fender flare body is configured to support at least opposite sides of the mud flap.

11. The vehicle of claim 9, wherein the fender flare body is configured to extend into the wheel well in front of the mud flap, and wherein the fender flare body is further configured to extend under the vehicle behind the mud flap.

12. The vehicle of claim 9, wherein the mud flap defines a portion of the wheel well.

13. The vehicle of claim 9, wherein the fender flare body includes a first surface and a second surface, the first and second surfaces defining a mud-flap channel adapted to receive the mud flap, wherein the first surface faces a front side of the mud flap and the second surface faces a rear side of the mud flap when the mud flap is received in the mud-flap channel.

14. The vehicle of claim 9, wherein the mud flap defines a portion of the wheel well.

15. A fender flare for attachment to a vehicle having a wheel well, the wheel well generally defining a volume and having an outer lateral edge, wherein the vehicle further has a mud flap extending from the wheel well, the mud flap including a front side generally facing the volume of the wheel well and a rear side generally facing away from the volume of the wheel well, the fender flare comprising:
   a generally arcuate fender flare body configured to extend along at least a substantial portion of the outer lateral edge of the wheel well, wherein the fender flare body includes an inner portion and an outer portion, wherein the inner portion extends from the outer portion and is configured to mate with structure of the vehicle that defines the wheel well, wherein the inner portion includes a first surface adapted to support the front side of the mud flap, and wherein the outer portion includes a second surface adapted to support the rear side of the mud flap.

16. The fender flare of claim 15, wherein the first surface and the second surface define a mud-flap channel adapted to receive the mud flap therein, wherein the first surface faces the front side of the mud flap and the second surface faces the rear side of the mud flap when the mud flap is received in the mud-flap channel.

17. The fender flare of claim 15, wherein the inner portion includes a flange configured to be coupled to structure of the vehicle that at least partially defines the wheel well, wherein the flange includes an engagement surface configured to face away from the volume of the wheel well and to engage the structure that at least partially defines the wheel well, and wherein the first surface is a portion of the engagement surface.

18. The fender flare of claim 15, wherein the fender flare body is configured to extend into the wheel well in front of the mud flap, and wherein the fender flare body is further configured to extend under the vehicle behind the mud flap.

19. A vehicle, comprising:
a vehicle body that defines a wheel well, wherein the wheel well has an outer lateral edge and generally defines a volume;
a mud flap coupled to the vehicle body and including a front side that faces the volume of the wheel well and a rear side that faces away from the volume of the wheel well; and
a fender flare according to claim 15 coupled to the vehicle body.

20. The vehicle of claim 19, wherein the mud flap defines a portion of the wheel well.

* * * * *